United States Patent
Liu et al.

(10) Patent No.: US 6,608,724 B2
(45) Date of Patent: Aug. 19, 2003

(54) PRECISION DISPENSING APPARATUS AND METHOD FOR MANUFACTURING THIN-FILM OPTICAL ASSEMBLY

(75) Inventors: Kowang Liu, Fremont, CA (US); Shih-Wei Liao, Fremont, CA (US)

(73) Assignee: Oplink Communications, Inc., San Jose, CA (US)

( * ) Notice: Subject to any disclaimer, the term of this patent is extended or adjusted under 35 U.S.C. 154(b) by 292 days.

(21) Appl. No.: 09/825,413

(22) Filed: Apr. 2, 2001

(65) Prior Publication Data

US 2002/0060862 A1 May 23, 2002

Related U.S. Application Data

(63) Continuation-in-part of application No. 09/721,293, filed on Nov. 21, 2000, now abandoned.

(51) Int. Cl.[7] .............................. G02B 7/02; G02B 5/22; G02C 7/10
(52) U.S. Cl. ....................... 359/811; 359/819; 359/885; 359/892; 351/163; 355/34; 156/64
(58) Field of Search ................................ 359/811, 819, 359/820, 808, 809, 885, 892, 893, 894; 351/163, 165; 355/34; 156/64

(56) References Cited

U.S. PATENT DOCUMENTS

| | | | | |
|---|---|---|---|---|
| 4,843,431 A | * | 6/1989 | Horiguchi et al. | 355/34 |
| 5,157,426 A | * | 10/1992 | Kronberg | 351/163 |
| 6,018,427 A | * | 1/2000 | Gillette et al. | 359/892 |
| 6,102,556 A | * | 8/2000 | Lieberman et al. | 359/892 |
| 6,369,964 B1 | * | 4/2002 | Chang | 359/885 |
| 6,504,661 B1 | * | 1/2003 | Odille et al. | 359/892 |

* cited by examiner

Primary Examiner—Loha Ben

(57) ABSTRACT

This invention discloses a machine for automatically attaching an optical filter to a lens. The machine includes lens table for supporting the lens. The machine further includes an attachment-medium dispenser system for dispensing a plurality of gapped-dots of an attachment-medium on a top surface of the lens along a peripheral line substantially according to a bottom-surface shape of the filter. The machine further includes a surface-mounting system for mounting the optical filter onto the top surface of the lens for stamping the gapped-dots into a continuous peripheral attachment-seal for attaching the filter to the lens and for sealing a peripheral interface-edge between the filter and the lens.

24 Claims, 4 Drawing Sheets

PRECISION DISPENSING APPARATUS AND METHOD FOR MANUFACTURING THIN-FILM OPTICAL ASSEMBLY

This Application is a Continuation-in-Part (CIP) Application claims a Priority Date of Nov. 21, 2000, benefited from a previously filed Application Ser. No. 09/721,293, now abandoned, by one of common Applicants of this Application.

FIELD OF THE INVENTION

The present invention relates generally to apparatus and method for manufacturing fiber optics components for carrying out optical signal transmission. More particularly, this invention relates to a new and improved automatic dispensing apparatus and method for dispensing high viscosity and high surface tension epoxy resin for enabling a simplified and automated surface mount process in assembling optical components.

BACKGROUND OF THE INVENTION

The manufacturers of fiber optical components are confronted with a growth limitation due to shortage of optical components. As ever-increased network communications are now carried out over the Internet, a requirement for high bandwidth communications is increasing with an explosive rate. One key development in the wired technology area (as opposed to wireless) to expand bandwidth is the deployment of optical fiber network systems. Optical networking systems are implemented by interconnecting active and passive components to perform important functions of optical signal transmission, reception, amplification, routing, switching, multiplexing, de-multiplexing, etc. One of the critical factors hampering the deployment of optical networking system is the shortage of passive components. An important factor that causes the component shortage is the limited manufacture capacity due to high percentage of manual handling of optical devices, resulting in limited and unpredictable quantity and quality. One can clearly appreciate such difficulties by examining a specific assembly processes in assembling the optical filters onto GRIN lens. The manual processes employed for manufacturing the filter-GRIN lens assembly are particularly difficult since tiny parts are required to be handled by human hands in the assembling processes that require high precision hand-eye coordination under the microscope.

The following descriptions present a general process flow of the conventional method for manufacturing the filter/GRIN lens assembly that involves great amount of manual labors. The process of assembling the filter/GRIN lens assembly begins with a step that the operators use a pair of tweezers to pick up GRIN lens from a vendor's shipping tray and turn the GRIN lens from a horizontal to a vertical orientation. The lens and filter are both solvent cleaned before assembly. The lens is then placed in a freestanding style with bottom wedge angle on the Gel-Pak. The clear deficiency in this procedure is that the lens is not constrained by a fixture so inexperienced operators have constant problem of having to pick up the fallen lens and reposition them in a straight up position. This problem is further compounded by the need that operator is to place the filter onto the unstable GRIN lens since the filter is not constrained by other holding mechanism except very minimal friction between two highly polished optical surfaces. Additionally, there are also problems that these elements may fall or become incorrectly positioned. While operators can manually hold the filter at the seemingly central position with one hand and apply the epoxy with the other. This cumbersome procedure requires great deal of skill carried out by experienced hand/eye coordination under the microscope, which only the veteran operators having such skill can properly handle the assembling process. If the filter position is not maintained during UV epoxy application process, repositioning of the filter causes uneven glue line and spill over on the optical surface, which sometimes result in rework when this unfavorable condition is discovered immediately. A more serious problem happens when the non-uniform glue line and improper sealing conditions are not discovered and the manufacturing processes proceed unchecked thus lead to product failure during reliability testing or failure at the customer's site if the improperly assembled products passes the reliability tests. After UV epoxy dispensing, operators then bring the assembled parts to be UV light cured. Finally, permanent thermal epoxy is applied manually and the finished parts are oven cured in a batch fashion.

Therefore, a need still exists in the art of manufacturing and designing the fiber optic filter/lens assemblies to provide new and automated manufacture equipment and processes to reduce manual labors and to improve product yields and performance reliability. Specifically, novel and improved manufacture equipment provides novel methods of fixing the filter to the GRIN lens for dispensing the ultraviolet glue to the filter/lens interfacing edges. It is further desirable that the novel manufacturing process can consistently provide high precision alignment and high uniformity of UV glue on the filter/lens interfacing edges such that product yield and reliability can be improved.

SUMMARY OF THE PRESENT INVENTION

It is therefore an object of the present invention to provide an improved apparatus and method for manufacturing and assembling a filter/lens assembly by use of an automatic filter/lens assembler to reduce the manual labors. The simplified process can further improves the product quality and reliability such that the aforementioned difficulties and limitations in the prior art can be overcome.

Specifically, it is an object of the present invention to provide an automatic optical filter/lens assembler to automatically handle the manufacturing processes of mounting, epoxy dispensing and curing and thermal epoxy dispensing processes with high precision with minimum human intervention. The filter/lens assembler is provided with an attachment-medium dispensing means for dispensing a plurality of gapped-dots of an attachment-medium on a top surface of the lens. The gapped-dots are dispensed along a peripheral line substantially according to a bottom-surface shape of the filter. A surface-mounting means then mounts the optical filter onto the top surface of the lens for stamping the gapped-dots into a continuous peripheral attachment-seal for attaching the filter to the lens and for sealing a peripheral interface-edge between the filter and the lens.

Another object of the present invention is to provide a new and improved method for automatically and reliably assembling high quality filter/lens assembly by minimizing human labors while maintaining precise filter/lens relative position by providing new configuration and methods for carrying out the UV dispensing and curing. New UV dispensing systems are disclosed to dispense the UV epoxy when the filter is pressed onto the lens on all sides of the filter/lens assembly such that the automated process can be carried out without impacting the filter/lens alignment.

Briefly, in a preferred embodiment, the present invention includes a machine for automatically attaching an optical filter to a lens. The machine includes lens table for supporting the lens. The machine further includes an attachment-medium dispensing means for dispensing a plurality of gapped-dots of an attachment-medium on a top surface of the lens along a peripheral line substantially according to a bottom-surface shape of the filter. The machine further includes a surface-mounting means for mounting the optical filter onto the top surface of the lens for stamping the gapped-dots into a continuous peripheral attachment-seal for attaching the filter to the lens and for sealing a peripheral interface-edge between the filter and the lens.

In a preferred embodiment, the present invention includes a machine for automatically attaching an optical filter to a lens. The machine includes a lens table for supporting the lens. The machine further includes a pick and place means for picking up and placing the optical filter on the lens for satisfying an alignment requirement. The machine further has an attachment-medium dispensing means for applying an attachment-medium on edge-surfaces surrounding an interface between the lens and the optical filter for securely attaching the filter to the lens. In a preferred embodiment, the machine further has a computerized controller for controlling the machine for accurately placing the filter on the lens for satisfying the alignment requirement. In a preferred embodiment, the machine further has a video monitoring means for monitoring the filter and the lens and for providing data to the computerized controller. In a preferred embodiment, the machine further has a lens table movement means for moving the lens table. In a preferred embodiment, the machine further has a cleaning means for cleaning the filter. In a preferred embodiment, the machine further has a gantry for supporting and moving the pick and placing means. In a preferred embodiment, the place means further comprises a vacuum tip for picking and holding on the filter. In a preferred embodiment, the computerized controller further comprises a dispensing process controller for controlling the pick and place means to press on the filter when the filter is placed on the lens fixed with the alignment requirement for carrying out an attachment-medium dispensing process. In a preferred embodiment, the attachment-medium dispensing means includes an epoxy dispensing means for applying an epoxy on edge-surfaces surrounding an interface between the lens and the optical filter for securely attaching the filter to the lens. In a preferred embodiment, the attachment-medium dispensing means further includes an ultraviolet epoxy curing means for curing an epoxy applied on edge-surfaces surrounding an interface between the lens and the optical filter for securely attaching the filter to the lens.

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 1:
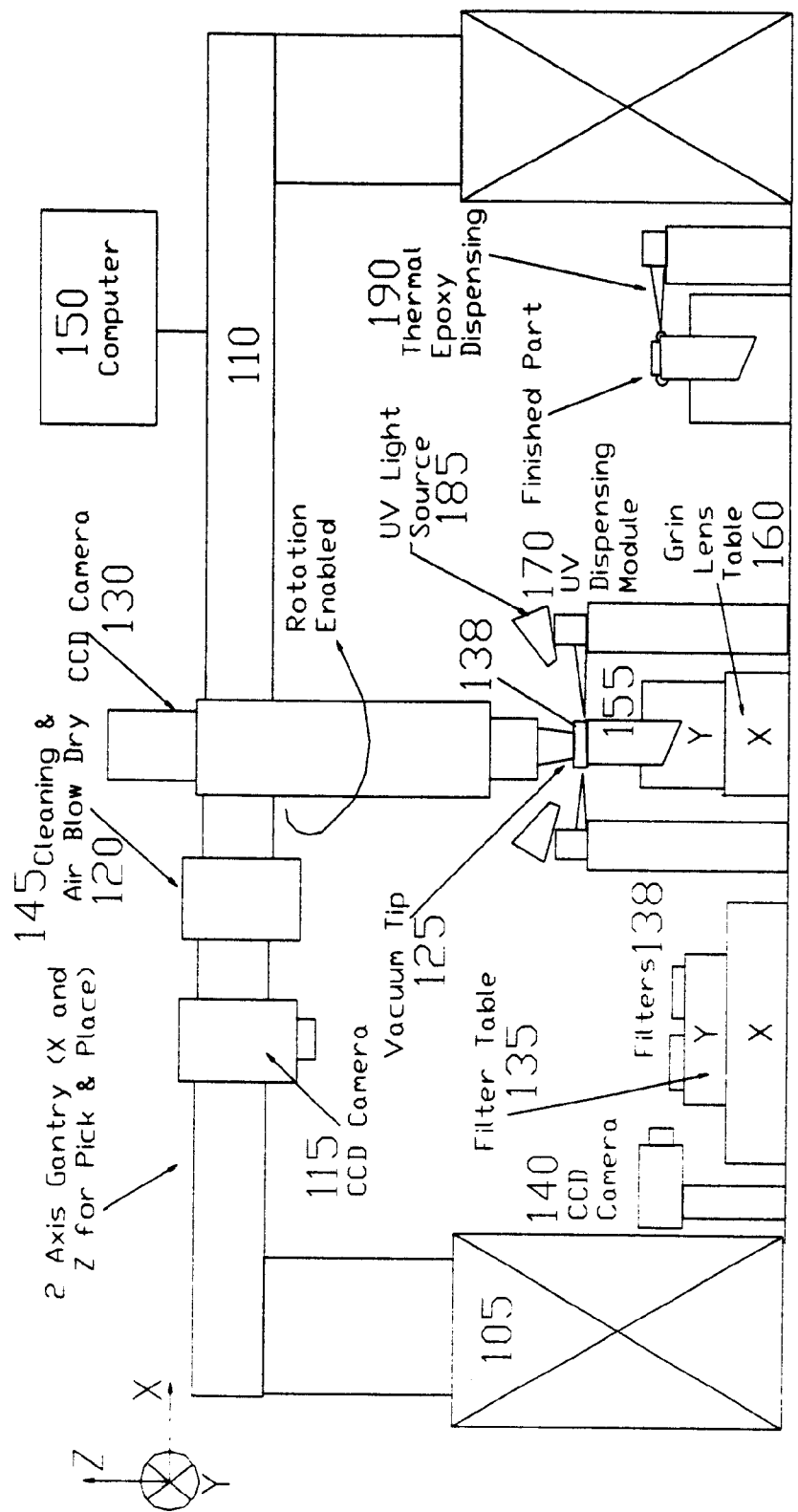
FIG. 1 is a functional schematic diagram for illustrating the functional processes of an automatic optical filter/lens assembler of this invention.

Referring to FIG. 1 for an automatic optical filter-lens assembler 100 of this invention. The filter-lens assembler includes a three-axis automatic pick and place gantry 110 supported on a system platform 105. The three-axis automatic pick-and-place gantry 110 provides three-dimensional freedom of movements along X–Y–Z axes for equipment mounted on the gantry 110 that include a CCD camera 115, a cleaning module 145 and air-blow dryer 120 and a pick-and-place vacuum tip 125 mounted with a charge-coupled display (CCD) camera 130.

The automatic optical filter-lens assembler further includes a two-axis filter positioning-table 135. This filter positioning-table 135 is a X–Y moveable positioning table having linear close-loop servomotors for controlling the position and speed of movement of the table with required accuracy. There are multiple spots located on the top surface of the positioning-table 135 for placing 2" waffle packs holding numerous optical filters. The number of the waffle packs and the positions of placement may be flexibly arranged depending on the table size, the traveling speed of the XY table and the pocket design for waffle packs such as pocket size, pitch and draft angle. The pick-and-place vacuum tip 125 is controlled to move to the top of a filter 138, take a zoomed image with CCD camera and analyze with pattern recognition feature in a host personal computer. The pick-and-place vacuum tip 125 then adjusts its position with a gantry movement to align with the position of a designated filter according to an XY coordinate. The pick-and-place vacuum tip 125 then moves down toward the waffle pack. The downward movement is decelerated when approaching the designated filter at certain distance to smoothly and gently reach a desired gap as seen from a $2^{nd}$ side viewing CCD camera 140. The vacuum pump connected to the pick-and-place vacuum tip 125 is turned on to suck up and securely hold the filter 138 to the vacuum tip. The gantry then controls the pick-an-place vacuum tip 125 to move up to a desired height and head toward the cleaning module 145. The cleaning module 145 is provided with IPA or other type of stronger solvent such as Acetone or mixture of Acetone/Etalon for cleaning the optical surface before the filter 138 is assembled to the lens in next stage of assembling operation. The bottom of the filter 138 is dipped into a solvent cleaning agent for a cleaning bath and then taken out to an air gun outlet 120 for carrying out a blow-dry operation. The air pressure to blow dry the filter is controlled within a certain blowing speed to prevent a fall off of the filter from the pick-and-place vacuum tip 125. The CCD camera continuously monitors and displays the operation and progress of these activities under the supervision and control of a computer 150 that function as an automatic controller of the automatic optical filter-lens assembler. After the cleaning and blow-dry processes are completed, the pick-and-place vacuum tip 125, holding on to the filter 138, is controlled to move to a GRIN lens positioning table 160 for mounting the filter 138 unto the lens 155.

The GRIN lens positioning-table 160 implemented in the automatic optical filter-lens assembler is employed to hold the GRIN lens 155 in a blind-hole type of fixture or self-centering vacuum chuck for precisely positioning the GRIN lens 155 at a predefined position on the positioning table 160. To provide greater flexibility to more conveniently align the filter with the GRIN lens 155, the GRIN lens positioning-table 160 can index along the Y direction during the assembling operation for mounting the filter 138 to the GRIN lens 155. With the gantry 110 moves the pick-and-place vacuum tip 125 linearly sideways X direction and simultaneously providing freedom of movements along the Z direction and the rotational θ directions, the filter 138 is controlled to mount onto the GRIN lens 155. Specifically, the X-axis linear servo-motorized gantry has high movement speed and high positioning accuracy with glass scale encoder as positioning feedback. The pick-and-place vacuum tip 125 completes the pick and place operations for mounting the filter onto the GRIN lens with a Z-axis close-loop servo-motor for Up/Down movement synchronized with a vacuum on-off switch monitored and controller by the computer 150 functioning as the controller of the filter-lens assembler. The pick up tip of the vacuum tip 125 is mounted on a rotating head for θ rotation in angular correction if necessary. The host computer 150 functions as controller of the filter-lens assembler. The computer issues command to take a zoomed image with the $3^{rd}$ overhead CCD camera 130 to process the image with pattern recognition feature and to record the XY position of the lens to send the gantry to move the cleaned filter 138 on top of the GRIN lens 155, rotate the filter 138 in θ axis if necessary and place it down while still using the vacuum to hold the filter position. This is a very important factor for achieving correct relative position between lens and filter before and during a process of UV epoxy dispensing to be further discussed below.

Figure 2:
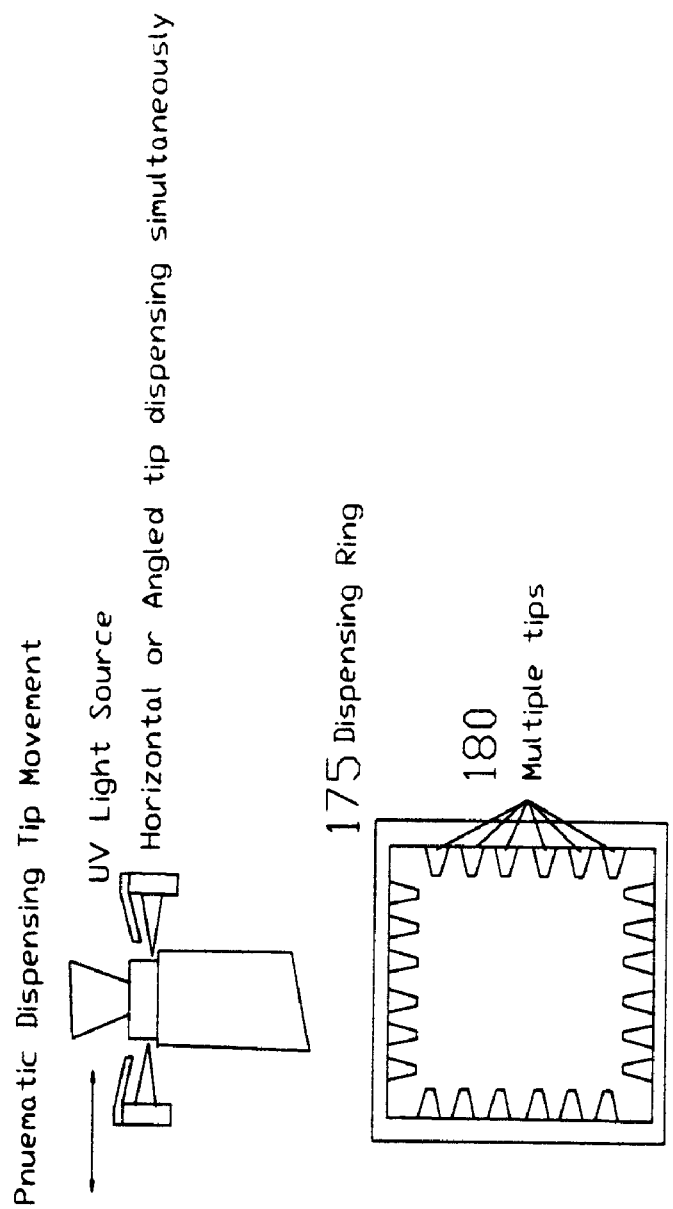
FIG. 2 is a top view of a UV epoxy dispensing system of this invention for simultaneously dispensing UV epoxy on multiple sides around the filter/lens interface.

After the filter 138 being mounted on the GRIN lens as a pressed down assembly, the pick-and-place vacuum tip 125 is lifted with filter still attached to the pick-and-place tip to prevent relative movement. Now the assembly is positioned at an elevation about the same height as an UV dispensing ring of the dispensing module 170. The UV dispensing module 170 surrounds the GRIN lens positioning-table 160 and the dispensing ring includes dispensing tips, sitting on a pneumatic driven manipulator, on all four sides of the ring for automatic UV epoxy dispensing along the perimeter of the filter/GRIN lens interface. Refer to FIG. 2 for the UV dispensing ring 175 with dispensing tips 180. The UV dispensing operation is carried out with the pick-and-place vacuum tip 125 presses down onto the filter/lens assembly such that the alignment of the filter/lens assembly is not impacted by the UV dispensing operations. After the UV dispensing over the filter/lens interface, the filter together with the GRIN lens are then moved to be within the UV ring light 185 for curing. The vacuum originally holding the GRIN lens is now turned off and the entire filter/lens assembly is now placed in the rotational holder for thermal epoxy dispensing to be further described below.

Specifically, after the UV dispensing and curing operations are completed, the gantry 110 elevates the UV bonded filter/lens assembly to dislodge it from the GRIN lens holding fixture, e.g., a blind hole and moves it to the top of thermal epoxy dispensing module 190. The filter/lens assembly is lowered into a lens holding fixture of the thermal-epoxy-dispensing module 190. The thermal-epoxy-dispensing module 190 starts to rotate the assembly while the thermal epoxy is dispensed concurrently. The assembly is rotated in a fashion to prevent any wobbling or tilting and to minimize rotational runout. And again, the distance between the dispensing tip and the UV covered circumference can be adjusted off-line with micrometer or on-line with linear actuator on the thermal epoxy dispensing module. After the dispensing, vacuum is turned off from the pick-up tip so the finished part now sits inside the blind hole and GRIN lens positioning system now indexes along Y-axis. The entire procedure then repeats automatically for assembling next filter/lens assembly.

In one preferred embodiment, the UV epoxy-dispensing and curing module 170 is configured as a square ring 175 with multiple dispensing tips on each of the four sides or two L-shaped brackets with multiple tips. The module is mounted on a stand, or two stands with bracket design, with rotary positioning control to swing in when dispensing is needed and to swing out when not needed. The rotary motion can be achieved with either servomotor or pneumatic rotary actuators. The relative position of the dispensing tip to the filter/lens interface can be adjusted off-line with micrometer or driven on-line by actuators (servo or pneumatic) to ensure correct glue position and uniform glue line. The advantages of multiple tips are higher throughput (multiple pots dispensed simultaneously) and lower cost compared to motorized single tip dispensing motion. UV curing light can be mounted on the dispensing module to swing in/out and pointed at the filter/lens perimeter after the dispensing is completed. The design for the swinging motion is to make way for the Y-axis indexing of GRIN lens positioning system. This system as now disclosed in this invention can dramatically increase the throughput of the existing manual assembly process and enhance the quality of the assembled optical assembly with improved yield and reliability.

According to above descriptions, three sets of CCD camera are implemented in this automatic optical filter/lens assembler and each of these CCD cameras has zooming capability to view the overhead and side images in different operations of the pick-and-place vacuum tip 125 together with the images of the positioning tables for assembling the filter to the lens. The host computer 150 functioning as the controller of the automatic lens/filter assembler continuously monitors the images to assure each movement to pre-designated location and to assure all the assembling activities are properly performed.

Figure 3A:
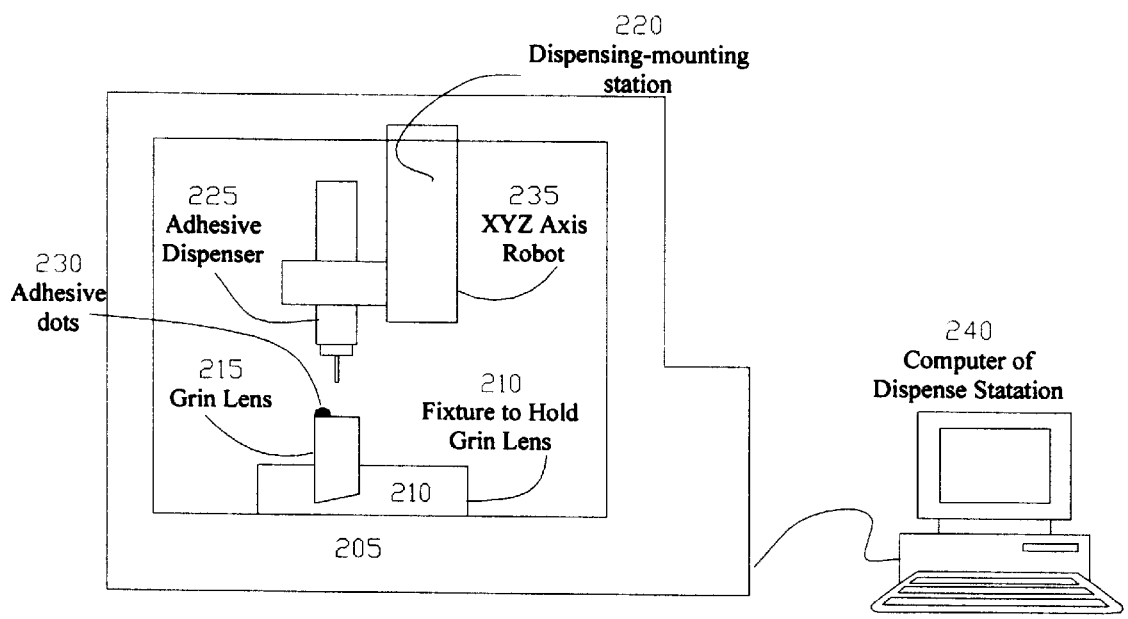
FIGS. 3A and 3B are schematic diagrams of a filter mounting machine of this invention for dispensing epoxy and for directly mounting a filter onto a GRIN lens.
Figure 3B:
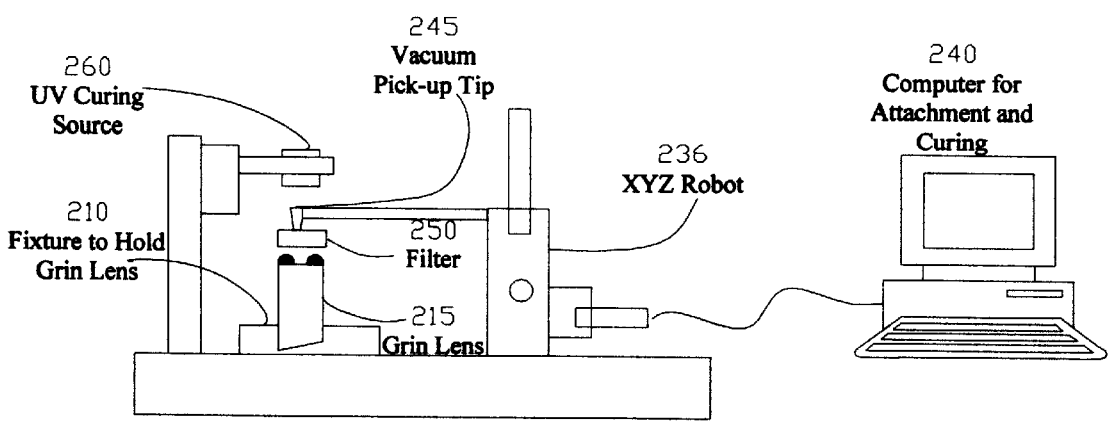
Figure 4:
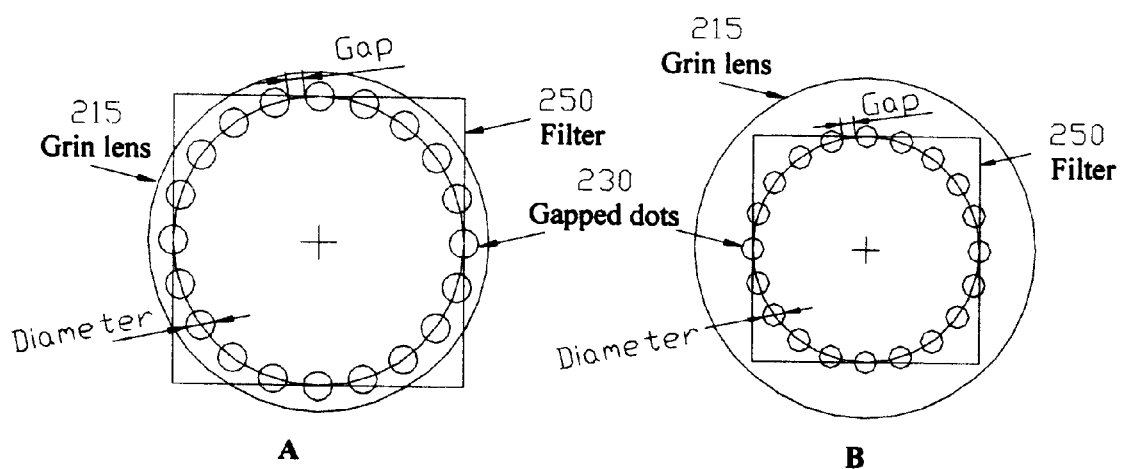
FIGS. 4A and 4B are two top views of a gapped epoxy dots dispensed on the top surface of a lens along a peripheral edge where the filter interfaces with the top surface of the GRIN lens for surface mounting a filter thereon.

FIGS. 3A and 3B show a simplified filter-stamp-mounting machine of this invention. The filter stamp-mounting machine 200 includes an X–Y table 205 mounted with a fixture 210 to securely hold a GRIN lens 215. The X–Y table first moves the GRIN lens 215 to a dispensing-stamp mounting station 220 that includes an epoxy dispenser 225. The epoxy dispenser 225 dispenses a plurality of gapped-dots 230 of adhesive attachment medium such as epoxy on the top surface of the GRIN lens 215 as shown in FIGS. 4A and 4B. The epoxy dispenser 225 held by an X–Y–Z robot 235 is controlled by a computer 240 for precisely dispensing a plurality of gapped dots 230 on the top surface of the GRIN lens 215. After the gapped dots are dispensed on the top surface of the GRIN lens 215, the computer 240 then controls the X–Y–Z robot 235 to move away from the epoxy dispenser 225. Referring now to FIG. 3B, another X–Y–Z robot 236 then controls a pick-and-place means 245 for picking a filter 250 for accurately mounting onto the top surface of the GRIN lens 215. The gapped dots of the adhesive attachment medium, e.g., the epoxy gapped dots 230 are stamped into a continuous peripheral seal along the edges of the GRIN lens for attaching the filter 250 to the lens 215. Meanwhile, the gapped dots 230 are stamped and expanded for connecting with the neighboring dots to become a continuous seal formed by the expanded dots of the adhesive attachment-medium to completely seal the interface between the GRIN lens 215 and the filter 250. The simplified filter-stamp-mounting machine further includes a UV-curing source 260 to cure the epoxy with ultraviolet light after the mounting-stamping operation is completed to securely seal and attach the filter to the GRIN lens.

FIGS. 4A and 4B are two top views of a top surface of the GRIN lens 215 with a plurality of gapped dots 230 of epoxy dispensed along the peripheral edges of the GRIN lens 215. As shown in FIGS. 4A and 4B, the size of the filter 250 can be smaller or larger than the top surface of the GRIN lens 250. The gapped dots are dispensed to completely seal the overlapping portion of the filter and the lens to seal and protect the optical path from moisture and particles. The gapped-dots 230 have a size ranging from 20,000–40,000 $\mu m^3$ with a distance ranging from 10 to 75 $\mu m$ between neighboring dots. In a preferred embodiment, the gapped dots are formed with ultra-violet curing epoxy that has a viscosity ranging from 2,500–35,000 cps. Particular consideration is applied to assure that when a filter 250 is mounted onto the top surface of the GRIN lens 215, the gapped dots will be stamped and expanded to form a continuous seal along the peripheral edges of the GRIN lens 215. In the meantime, the size of the dots is controlled such that the stamped and expanded dots are not expanding and spreading to the central portion of the GRIN lens 215. The central portion of the filter 250 now attached to the GRIN lens 215 for passing optical beams is free from films of adhesive attachment medium. Minimum obstructions and interference of optical transmission are achieved while secure attachment of the filter to the GRIN lens is now accomplished with direct surface mounting process that can be conveniently performed and controlled. Automation of such mounting processes are greatly enhanced with simple and direct surface mounting procedure while excellent optical transmission performance is maintained as the epoxies are prevented from spreading over to the area for optical transmission. These advantages are accomplished by controlling the size of the gapped dots, the distance between neighboring dots and by minimizing the effect of viscosity change of the adhesive attachment medium. With proper control of these parameters, the filter can be directly surface mounted to the GRIN lens to stamp on the gapped dots to form continuous peripheral edge seal for securely sealing and attaching the filter to the GRIN lens.

Therefore, the present invention discloses improved apparatus and method for manufacturing and assembling a filter/lens assembly by use of an automatic filter/lens assembler to reduce the manual labors while improving the product quality and reliability such that the difficulties and limitations in the prior art can be overcome. Specifically, this invention provides an automatic optical filter/lens assembler to automatically handle the manufacturing processes of mounting, UV epoxy dispensing and curing and thermal epoxy dispensing processes with high precision with minimum human intervention. The filter/lens assembler is provided with multi-dimensional movement gantry coordinated with video imaging system to precisely control a pick-and-place vacuum tip for mounting the filter to the lens. Additionally, the vacuum tip is controlled to press on the filter/lens assembly during the epoxy dispensing and curing processes to assure that the filter and lens are maintained at fixed positions. This invention also provides a new and improved method for automatically and reliably assembling high quality filter/lens assembly by minimizing human labors while maintaining precise filter/lens relative position by providing new configuration and methods for carrying out the UV dispensing and curing. New UV dispensing systems are disclosed that is able to dispense the UV epoxy when the filter is pressed onto the lens on all sides of the filter/lens assembly such that the automated process can be carried out without impacting the filter/lens alignment.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as falling within the true spirit and scope of the invention.

I claim:

1. A machine for automatically attaching an optical filter to a lens comprising:

a lens table for supporting said lens;

an attachment-medium dispensing means for dispensing a plurality of gapped-dots of an attachment-medium on a top surface of said lens along a peripheral line substantially according to an interface profile between a bottom-surface of said filter and said top surface of said lens;

a surface-mounting means for mounting said optical filter onto said top surface of said lens for stamping said gapped-dots into a continuous peripheral attachment-seal for attaching said filter to said lens and for sealing a peripheral interface-edge between said filter and said lens.

2. The machine of claim 1 further comprising:

a computerized controller for controlling said machine for accurately dispensing said plurality of gapped-dots of said attachment medium on said top surface of said lens.

3. The machine of claim 2 wherein:

said computer controller further controlling said attachment-medium dispensing means for dispensing said gapped-dots having a size ranging from 20,000–40,000 $\mu m^3$ with a distance ranging from 10 to 75 $\mu m$ between neighboring dots.

4. The machine of claim 1 wherein:

said dispensing means is provided for dispensing an ultra-violet curing epoxy as an attachment-medium.

5. The machine of claim 3 wherein:

said dispensing means is provided for dispensing an ultra-violet curing epoxy having a viscosity ranging from 2,500–35,000 cps.

6. The machine of claim 1 further comprising:

an X–Y table supported on said lens table for moving said lens.

7. The machine of claim 1 wherein:

said attachment medium dispensing means further comprising a first three-dimensional robot for adjusting a position of said attachment dispensing means.

8. The machine of claim 1 wherein:

said surface-mounting means further comprising a second three-dimensional robot for adjusting a position of said surface-mounting means.

9. The machine of claim 8 wherein:

said surface-mounting means further comprising a vacuum pick-and-placing means for picking and placing said optical filter onto said top surface of said lens.

10. The machine of claim 1 further comprising:

an ultraviolet curing means for curing an ultraviolet-curing epoxy.

11. A method for automatically attaching an optical filter to a lens comprising:

providing the lens supported on a table;

employing an attachment-medium dispensing means for dispensing a plurality of gapped-dots of an attachment-medium on a top surface of said lens along a peripheral line substantially according to an interface profile between a bottom-surface of said filter and said top surface of said lens;

mounting said optical filter onto said top surface of said lens for stamping said gapped-dots into a continuous peripheral attachment-seal for attaching said filter to said lens and for sealing a peripheral interface-edge between said filter and said lens.

12. The method of claim 11 further comprising:

employing a computerized controller for controlling said machine for accurately dispensing said plurality of gapped-dots of said attachment medium on said top surface of said lens.

13. The method of claim 12 wherein:

adjusting a position of said surface-mounting means by employing a second three-dimensional robot.

14. The method of claim 11 wherein:

said step of dispensing attachment-medium is a step of dispensing an ultra-violet curing epoxy on said top surface of said lens.

15. The method of claim 14 wherein:

said step of dispensing said ultra-violet curing epoxy is a step of dispensing said ultra-violet curing epoxy having a viscosity ranging from 2,500–35,000 cps.

16. The method of claim 11 wherein:

said step of dispensing said gapped-dots on said top surface of said lens is a step of dispensing said gapped dots having a size ranging from 20,000–40,000 $\mu m^3$ with a distance ranging from 10 to 75 $\mu m$ between neighboring dots.

17. The method of claim 11 further comprising:

moving said lens with an X–Y table supported on said lens table.

18. The method of claim 11 wherein:

adjusting a position of said attachment dispensing means by employing a first three-dimensional robot.

19. The method of claim 11 further comprising a step of:

curing an ultraviolet-curing epoxy by employing an ultraviolet curing means.

20. The method of claim 11 wherein:

said step of mounting said optical filter onto said top surface of said lens further comprising a step of employing a vacuum pick-and-placing means for picking and placing said optical filter to mount onto said top surface of said lens.

21. An optical device comprising:

an optical filter attached to a lens; and an attachment-medium dispensed on a top surface of said lens along a peripheral line substantially according to a bottom-surface shape of said filter; and said attachment-medium constituting a continuous peripheral attachment-seal for attaching said filter to said lens and for sealing a peripheral interface-edge between said filter and said lens.

22. The optical device of claim 21 wherein:

said attachment-medium constituting said continuous peripheral attachment-seal further comprising an ultraviolet curing epoxy.

23. The optical device of claim 22 wherein:

said ultra-violet curing epoxy having a viscosity ranging from 2,500–35,000 cps.

24. The optical device of claim 23 wherein:

said attachment-medium constituting said continuous peripheral attachment-seal between said filter and said lens further constituting stamped-expansion of a plurality of gapped-dots of said UV curing epoxy wherein said gapped dots having a size ranging from 20,000–40,000 $\mu m^3$ with a distance ranging from 10 to 75 $\mu m$ between neighboring dots.

* * * * *